Norman W. Wheeler,

Steam Pumping Engine.

4478

REISSUED JUL 18 1871

Witnesses:
C. Raettig.
William H. Rogers.

Inventor:
Norman W. Wheeler

Sheet A.

Sheet 2. 2 Sheets

Norman W. Wheeler,

Steam Pumping Engine.

4478

Witnesses:

C. Raetig.

William H. Rogers.

Inventor:

Norman W. Wheeler

Sheet B

UNITED STATES PATENT OFFICE.

NORMAN W. WHEELER, OF MORRISTOWN, NEW JERSEY.

IMPROVEMENT IN STEAM PUMPING-ENGINES.

Specification forming part of Letters Patent No. 115,670, dated June 6, 1871; reissue No. 4,478, dated July 18, 1871.

*To all whom it may concern:*

Be it known that I, NORMAN W. WHEELER, of Morristown, Morris county and State of New Jersey, have invented a new and useful Improvement in Steam Pumping-Engines; and I do hereby declare that the following is a full, clear, and exact description thereof, reference being had to the accompanying drawing making part of this specification—

Figure 2:
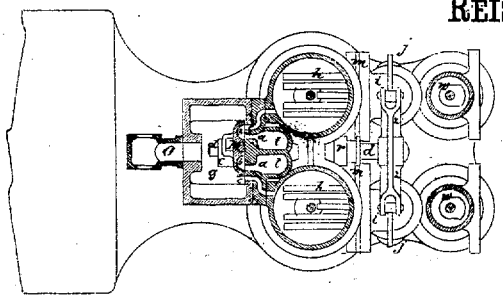
Figure 1:
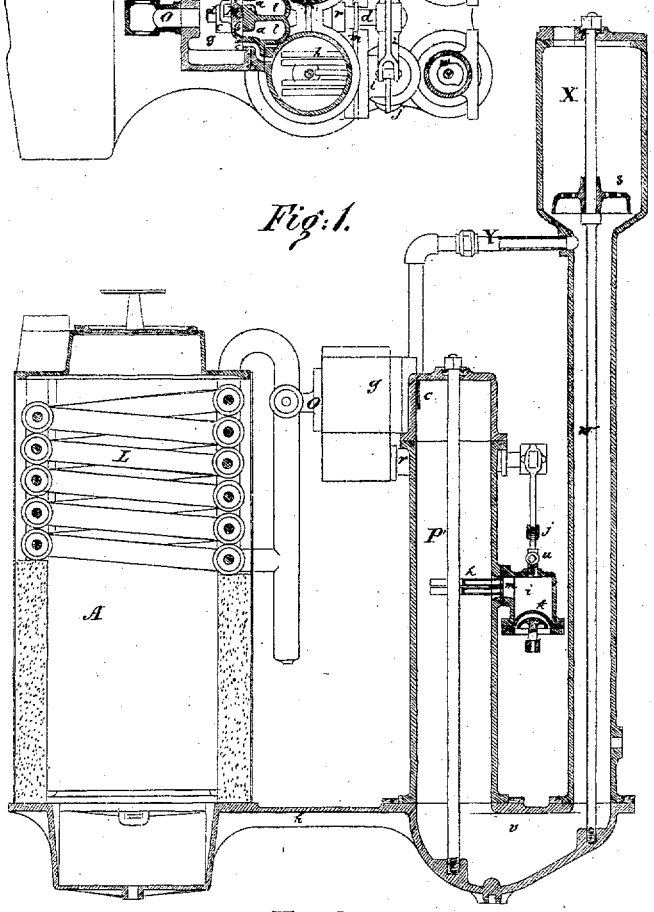
Figure 3:
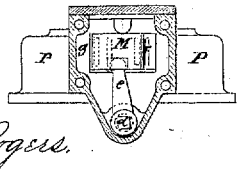
Figure 4:
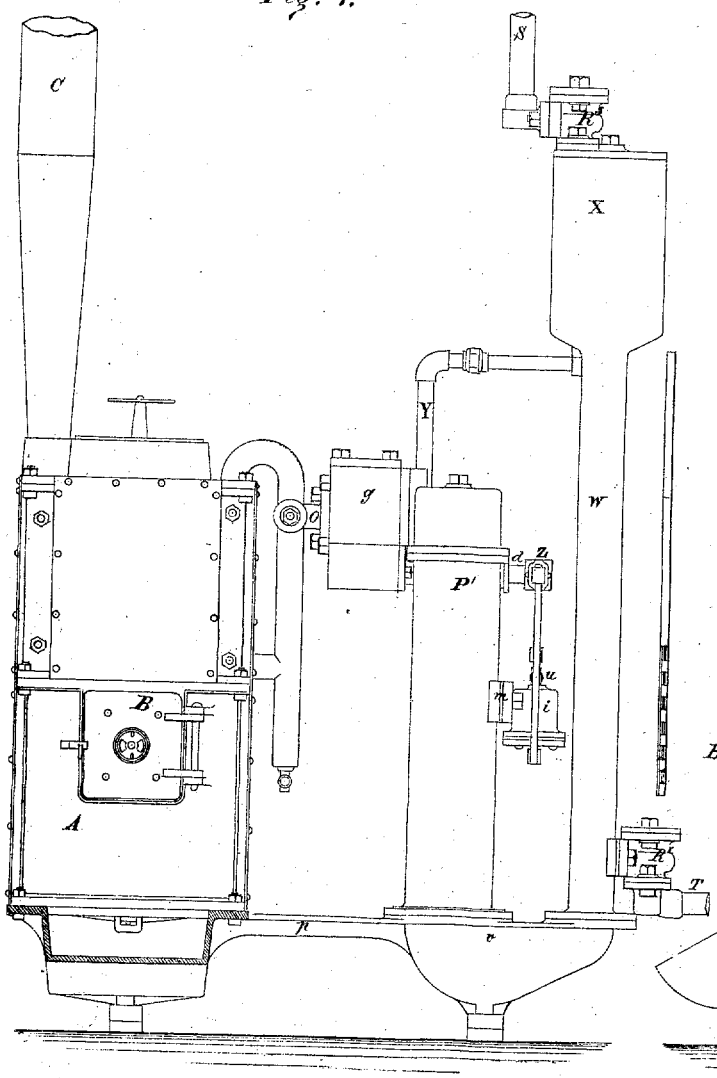
Figure 5:
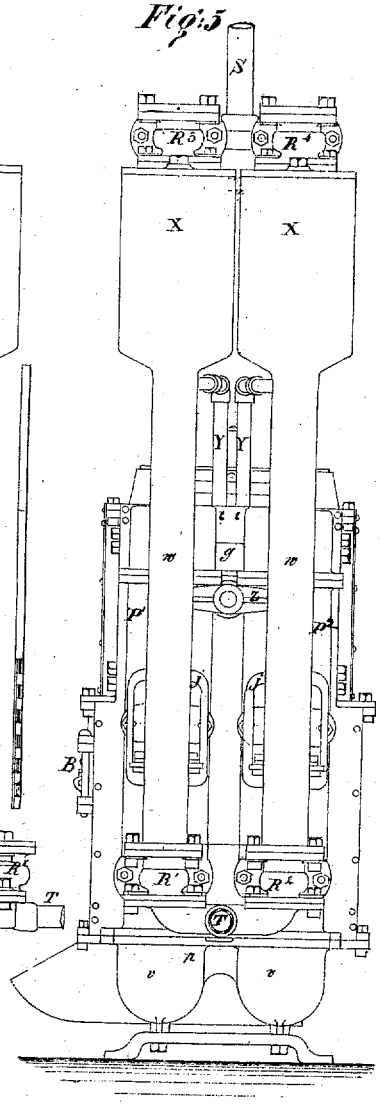

Figure 1, Sheet A, being a sectional elevation; Fig. 2, a sectional plan; Fig. 3, a sectional elevation to show details; Fig. 4, Sheet B, a side elevation; and Fig. 5, an end elevation.

This invention is based upon the principles involved in the steam pumping-engine of Savery, described in elementary and historical works upon the steam-engine, and also chiefly upon the following well-known facts: When water is inclosed or impounded in a vessel made of good heat-conducting material and the vessel is exposed to sufficient heat, the water will be wholly or partially converted into steam and a pressure be exhibited within the vessel; and if the vessel be then exposed to a lower heat the pressure will be reduced within it; and when steam is introduced into a body of cool water below the surface the steam will rise up through the water in the form of bubbles and be wholly or partially condensed.

In the drawing, A is a furnace or fire-place; B, the furnace-door; C, the smoke-pipe; L, a boiler, formed of tubes in the example before us; and O, a steam-pipe connecting the boiler with a steam-chest, *g*. Within the steam-chest *g* is a double slide-valve, M, familiar to steam-engineers, with two exhaust-cavities, *b b*, and working upon a proper seat, which has two steam-ports or passages, *c c*, which passages connect with the upper parts of two working vessels, $P^1$ $P^2$. The seat has also two exhaust-ports or passages, *a a*, leading to two exhaust-chambers, *t t*. Upon the side of each working vessel $P^1$ or $P^2$ is secured a valve-thrower, consisting of the barrel *i*, flexible diaphragm *k*, which diaphragm may be replaced by a piston and a division-plate, *m*, into which are set the tubes *h* projecting into working vessels. The tubes *h* have closed ends, and open into the barrel *i*. A button, *l*, is fitted to come in contact with the outer surface of the diaphragm *k*, and attached, by means of yoke *j* and a suitable rod, to one end of a lever or double-arm, Z, mounted upon a rock-shaft, *d*, which passes through a stuffing-box into the steam-chest *g*, and, by the arm *e* mounted upon it, is capable of moving the valve M. Two stand-pipes, *w w*, are provided, and each connected with a working vessel, $P^1$ $P^2$, by a channel, *v*, in the channel-plate *p*, which plate supports the whole engine. To the stand-pipes *w w* are attached the suction clack-valves $R^1$ $R^2$ opening into the stand-pipes, and both valves connected with the suction-pipe T. To the tops of the stand-pipes *w w* are attached two deliver clack-valves, opening outward into and connected with the delivery-pipe S. The exhaust-chambers *t t* are connected each with the stand-pipe upon its own side by the exhaust-pipes Y Y, and above the openings of the exhaust-pipes, into the stand-pipes *w w*, is an inverted distributing-cup, *s*, perforated with small holes.

The functions of this engine are the drawing and forcing of water or other liquids which are capable of being vaporized into steam, and its preparation and action may be described in the following words: The barrel *i* of each valve-thrower is to be filled with water, through the cock *u*, to such an extent that the barrel *i* and the tubes *h* will be full when the diaphragm *k* is retracted into the barrel *i*, as shown in the drawing, and the cock *u* closed, thus impounding the water within. The stand-pipes *w w*, the working vessels $P^1$ $P^2$, and the spaces connected with them are to be filled with water, a part of which will pass through one of the passages *c* into the steam-chest *g*, and thence, through the steam-pipe O, into the boiler L, and fill it. A fire is then to be lighted in the furnace A, which will heat the water in the boiler and finally generate steam. The valve *m* is, by preference, made too short to wholly cover both of the ports *c c* at the same time, so that the steam is at no time confined by a greater force than that of the column of water in the stand-pipes *w w* and the delivery-pipe S, but the valve M should be so placed as to completely uncover one of the ports *c* at starting, when one button, *l*, will be in contact with its diaphraghm *k*. The steam generated in the boiler will pass through the steam-chest *g* and passage *c* into the upper part of one of the working vessels $P^1$, and force out through the delivery-valve R an equivalent volume of water. This action will continue until the water in the working vessel $P^1$ is depressed so far that the tubes *h* will be surrounded by steam instead of by water, as before, when the heat of the steam will pass through the metal of the tubes *h*, heat the impounded water within them, and generate steam-pressure within the valve-thrower, which will take effect upon the diaphragm *k*, distend it, and, by its connection through the button *l*, yoke and rod *j*, lever Z, rock-shaft *d*, and arm *e*, shift the valve M so as to shut off the steam-passage *c*, which had been open, and direct the steam into the other working vessel $P^2$ through the other passage *c*. The steam generated within the valve-thrower by reason of the contact of working-steam with the tubes *h*, or any part of the impounding-vessel, we may designate as secondary steam. As the top of the working vessel which will be brought into communication with the boiler by this action is higher than the previous level of the water in the steam-chest *g*, the first effect will be the flow of water from the working vessel P, through the lower part of the passage *c*, into the steam-chest *g*, to equalize the level, while the steam will flow through the upper part of the passage *c* in the reverse direction, and the water lost by vaporization in the boiler L will be replaced by water from the steam-chest *g* flowing through the steam-pipe O, which must be so large that the current of steam will not prevent the flow of the reverse current of water; thus the boiler L will be kept supplied with water. During the further depression of the water in the working vessel thus brought into work, and until the water shall have reached the lowest part of the passage *c*, the surplus water in the steam-chest *g* will flow back into the working vessel P, after which the water will be depressed and a volume of water be forced out through the appropriate valve R, as described in connection with the first working vessel. When the valve M is shifted to direct the steam into the second working vessel the first steam-port *c* will be covered by the exhaust-cavity *b*, and the steam in the first working vessel be free to escape, through the passage *c*, cavity *b*, chamber *t*, and pipe Y, into the stand-pipe *w* under the distributing-cup *s*, which will break the current of steam into small bubbles, which, upon rising through the cold water in the upper part X of the stand-pipe *w*, will be condensed. This will have the effect of producing a more or less perfect vacuum in the stand-pipe *w*, working vessel P, and their connections, whereby water will be drawn in through the suction-pipe T and valve R, and the working vessel be filled with water ready for another stroke. The water which re-enters the working vessel will be cooler than the steam which previously surrounded the tubes *h*, and will condense the secondary steam and cool the impounded water, relieving the pressure and allowing the diaphragm *k* to retract so as to offer but little if any resistance to the next required shifting of the valve M by the action of the opposite valve-thrower, which will operate when the working-steam reaches its tubes *h*, as before described. Thus the engine will continue to operate, each working vessel alternating with the other; the boiler-supply being automatic and reasonably sure; the danger from explosion reduced to a minimum, because the greatest possible pressure will be that due to the hydrostatic column in the delivery and stand-pipes; the friction and wear of parts amounting to very little, because of simplicity and small amount of motion in the working parts; and the attendance required will be but little more than feeding of the fire.

This engine is, in many respects, similar to that of Savery, before mentioned. The drawing has been lettered to correspond, so far as possible, with the cut of the Savery engine published in "Bourne's Steam-Engine," for the purpose of indicating the similarities and differences. We see in both the boiler L, the working vessels $P^1$ $P^2$, the valves $R^1$ $R^2$ $R^3$ $R^4$, and the connecting-pipes. His steam-pipes $O^1$ $O^2$ correspond to my steam-pipe O and passages *c c*, except that I have added exhaust functions to those of the passages *c c*. The valve M corresponds to mine, except that mine is worked automatically and his was hand-wrought. His pipes Q Q correspond to my channels *v v*. He instructed his assistants that a loss of heat would follow the complete expulsion of water from the working vessels, because of the colder water which would then be introduced and come in contact with the steam upon the surface, and directed them to shift the valve M before the working vessel under pressure was completely filled with steam, and I accomplish a like result by attaching the valve-throwers to the working vessels some distance above their bottoms.

In the engine under consideration many defects incident to other previously-tried engines which work by direct contact of steam upon the water are eliminated. The valve-thrower has ample power to move the steam-valve at the proper time, and the action of the engine is not dependent upon such slight forces as may be derived from floats or short columns of water. The boiler is separate and distinct from the working vessels, and is never placed in direct connection with the condensers to draw off steam which does not work, and to cool the water in the boiler by the escape of vapor under a reduced pressure.

It is not claimed that by the use of this engine a high duty per pound of coal can be realized, as the losses from absorption and radiation of heat will be considerable, and no benefit can be derived from the expansion of steam in the working vessels, yet the aggregate of these losses will be scarcely greater than that of the ordinary piston steam-pump practice, while for many uses the safety, automaticity, and intrinsic cheapness of my engine will make it of great use to the public.

I claim as my invention—

1. The combination and arrangement, in relation to each other, of the stand-pipe *w*, distributing-cup *s*, and exhaust-pipe Y, substantially as and for the purposes described.

2. The combination of the valve M, exhaust-pipes Y Y, and stand-pipes *w w*, substantially as and for the purposes described.

3. The combination and connection of the valve M with the working vessel $P^1$ and valve-thrower *h i k*, substantially as and for the purposes described.

4. The combination of the tubes *h*, barrel *i*, diaphragm *k*, and working vessel $P^2$, substantially as and for the purpose set forth.

5. The combination of the steam-pipe O, passages *c c*, and valve M, when they are so arranged as to supply the boiler with water, substantially as described.

6. The combination of the automatically-operated valve M with the two working vessels $P^1$ $P^2$ and the two condensing stand-pipes *w w*, substantially as and for the purposes described.

7. Actuating a valve, as M, in two or more directions, by means of pressure of secondary steam generated in the manner and in the apparatus, substantially as described.

NORMAN W. WHEELER.

Witnesses:
C. RAETTIG,
WILLIAM H. ROGERS.